United States Patent
Li et al.

(10) Patent No.: US 12,249,132 B2
(45) Date of Patent: Mar. 11, 2025

(54) ADAPTING GENERATIVE NEURAL NETWORKS USING A CROSS DOMAIN TRANSLATION NETWORK

(71) Applicant: Adobe Inc., San Jose, CA (US)

(72) Inventors: Yijun Li, Seattle, WA (US); Nicholas Kolkin, San Francisco, CA (US); Jingwan Lu, Santa Clara, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 407 days.

(21) Appl. No.: 17/815,451

(22) Filed: Jul. 27, 2022

(65) Prior Publication Data

US 2024/0037922 A1   Feb. 1, 2024

(51) Int. Cl.
*G06V 10/82*   (2022.01)
*G06V 10/46*   (2022.01)
*G06V 10/77*   (2022.01)

(52) U.S. Cl.
CPC ............ *G06V 10/82* (2022.01); *G06V 10/469* (2022.01); *G06V 10/7715* (2022.01)

(58) Field of Classification Search
None
See application file for complete search history.

(56) References Cited

U.S. PATENT DOCUMENTS

2022/0044352 A1*  2/2022  Liao .................... G06F 18/2135
2024/0320966 A1*  9/2024  Wu ..................... G06V 10/7715

OTHER PUBLICATIONS

Semantic invariant cross-domain image generation with generative adversarial networks, BY Xiaofeng Maoa et al., Neurocomputing 293 (2018) 55-63 (Year: 2018).*
T. Karras, S. Laine, and T. Aila. A style-based generator architecture for generative adversarial networks. In CVPR, 2019.
Tero Karras, Miika Aittala, Janne Hellsten, Samuli Laine, Jaakko Lehtinen, Timo Aila. Training Generative Adversarial Networks with Limited Data. In NeurIPS, 2020.
Shengyu Zhao, Zhijian Liu, Ji Lin, Jun-Yan Zhu, Song Han. Differentiable Augmentation for Data-Efficient GAN Training. In NeurIPS, 2020.
Yijun Li, Richard Zhang, Jingwan Lu, Eli Shechtman. Few-shot Image Generation with Elastic Weight Consolidation. In NeurIPS, 2020.
Utkarsh Ojha, Yijun Li, Jingwan Lu, Alexei A. Efros, Yong Jae Lee, Eli Shechtman, Richard Zhang. Few-shot Image Generation via Cross-domain Correspondence. In CVPR, 2021.

(Continued)

*Primary Examiner* — Vikkram Bali
(74) *Attorney, Agent, or Firm* — Keller Preece PLLC

(57) ABSTRACT

The present disclosure relates to systems, non-transitory computer-readable media, and methods for adapting generative neural networks to target domains utilizing an image translation neural network. In particular, in one or more embodiments, the disclosed systems utilize an image translation neural network to translate target results to a source domain for input in target neural network adaptation. For instance, in some embodiments, the disclosed systems compare a translated target result with a source result from a pretrained source generative neural network to adjust parameters of a target generative neural network to produce results corresponding in features to source results and corresponding in style to the target domain.

20 Claims, 11 Drawing Sheets

(56) References Cited

OTHER PUBLICATIONS

Tan J. Goodfellow, Jean Pouget-Abadie, Mehdi Mirza, Bing Xu, David Warde-Farley, Sherjil Ozair, Aaron Courville, Yoshua Bengio. Generative Adversarial Networks. In NIPS, 2014.
Justin Johnson, Alexandre Alahi, Li Fei-Fei. Perceptual Losses for Real-Time Style Transfer and Super-Resolution. In ECCV, 2016.
Phillip Isola, Jun-Yan Zhu, Tinghui Zhou, Alexei A. Efros. Image-to-Image Translation with Conditional Adversarial Nets. In CVPR, 2017.

* cited by examiner

ADAPTING GENERATIVE NEURAL NETWORKS USING A CROSS DOMAIN TRANSLATION NETWORK

BACKGROUND

In the field of digital image editing, deep generative models have become increasingly effective in various applications such as producing realistic images from randomly sampled seeds of an image domain. These models, such as generative adversarial networks ("GANs"), have revolutionized digital image synthesis, enabling photorealistic rendering of complex digital images, such as portrait images. Indeed, GANs have made significant progress in synthesizing images which appear photorealistic when trained on domains comprising a large number of sample digital images. However, training GANs and other neural networks generally requires extensive amounts of data, time, and computation resources. One conventional solution for training a network includes adapting a neural network pretrained on an adequate source domain to generate results corresponding to a relatively small target domain. Unfortunately, when adapting GANs to generate digital images corresponding to a target domain consisting of a relatively small number of sample images, conventional systems exhibit a number of disadvantages, such as inefficiency in training and/or adapting a target network to the target domain and inaccuracy in generating digital images corresponding to the target domain.

BRIEF SUMMARY

Embodiments of the present disclosure provide benefits and/or solve one or more of the foregoing or other problems in the art with systems, non-transitory computer-readable media, and methods for adapting generative neural networks using a cross domain translation network. For example, the disclosed systems fine tune a target generative neural network pretrained on a large source domain to generate digital images corresponding to a relatively small domain, such that knowledge learned from the source domain is inherited while fitting the target network to the target domain. Furthermore, embodiments of the present disclosure utilize a cross domain translation network to map images generated by the target generative neural network to the source domain. Using translated images as input, the disclosed systems adapt generative neural networks to target domains with improved correspondence, such that results are different in terms of source and target domain styles but share other attributes, such as facial identity, pose, and hair style. In this manner, the disclosed systems allow for accurate, efficient, and flexible adaptation of generative neural networks to target domains.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
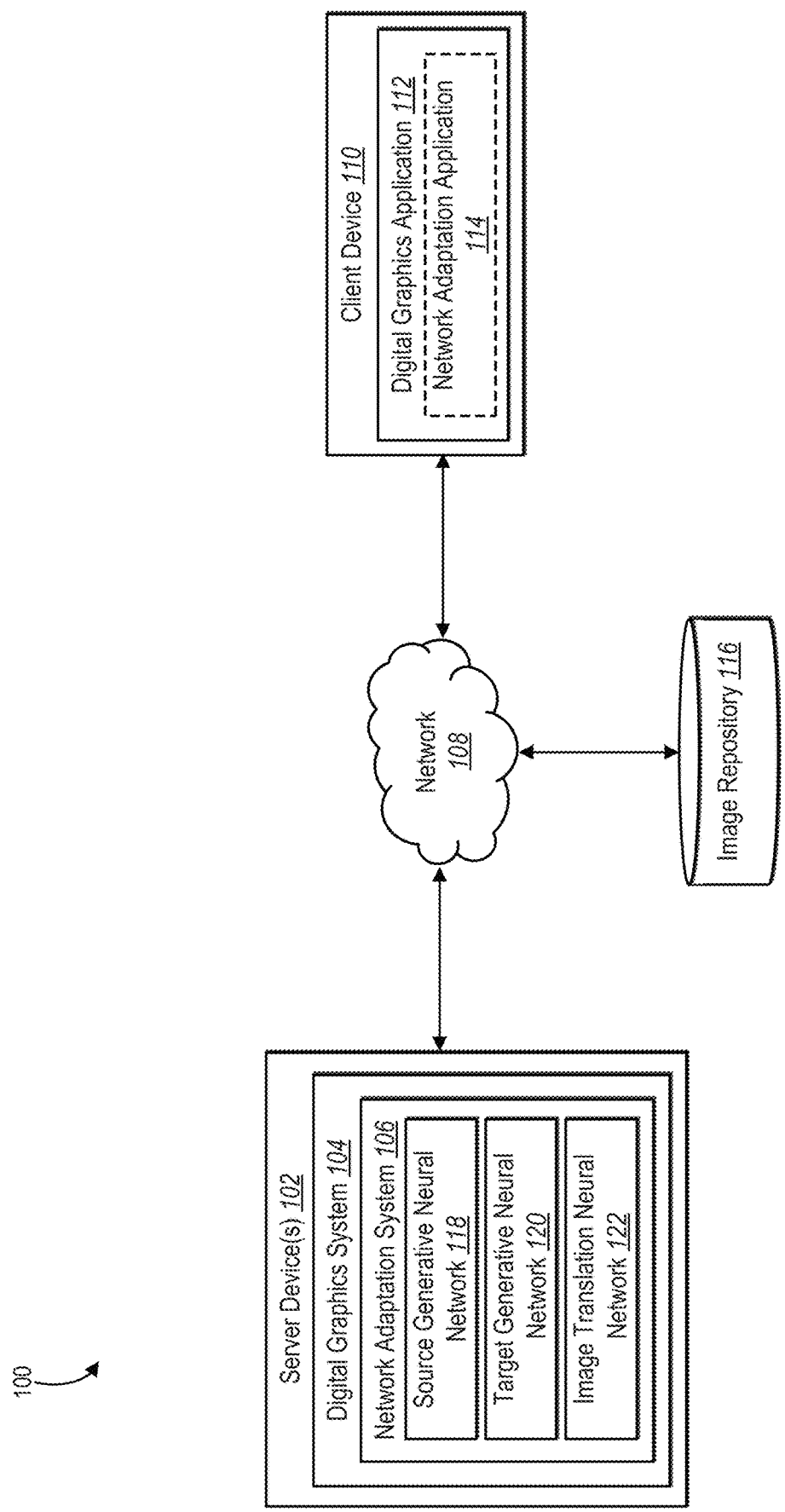
FIG. 1 illustrates a diagram of an environment in which a neural network adaptation system operates in accordance with one or more embodiments.

This disclosure describes one or more embodiments of a neural network adaptation system that utilizes an image translation neural network to adapt a generative neural network to a target domain. More specifically, embodiments of the present disclosure adapt a generative neural network, pretrained on a large source domain, to a relatively small target domain utilizing an image translation neural network to align results of the adapted generative neural network with improved correspondence between source and target domains. For example, given a source generative neural network and a target generative neural network, the neural network adaptation system utilizes an image translation neural network to map results of the target generative neural network back to the source domain and compares the translated results with results of the source generative neural network to train the target generative neural network for improved correspondence between source and target domains.

To further illustrate, in one or more embodiments, the neural network adaptation system generates, from an input latent vector, a source digital image utilizing a source generative neural network corresponding to and pretrained on a source domain. Further, in one or more embodiments, the neural network adaptation system generates, from the same input latent vector, a target digital image utilizing a target generative neural network corresponding to a target domain. In response to generating the target digital image, the neural network adaptation system generates a translated digital image by mapping the target digital image to the source domain utilizing an image translation neural network. In response to generating the translated digital image, the neural network adaptation system adjusts parameters of the target generative neural network based on a comparison of visual features of the translated digital image and the source digital image generated by the source generative neural network.

Additionally, in one or more embodiments, the neural network adaptation system initializes parameters of a target generative neural network by matching the parameters to that of a source generative neural network pretrained on a source dataset. During training of the target generative neural network, in some embodiments, the parameters of the target generative neural network are adjusted based on a comparison of target results with actual (i.e., real) digital images of the target domain (i.e., based on an adversarial loss). Also, in some embodiments, the parameters of the target generative neural network are adjusted based on the adversarial loss and a comparison of visual features of translated target results with corresponding results of the source generative neural network.

Furthermore, in some embodiments, the neural network adaptation system compares the translated target results with corresponding results of the source generative neural network within a feature space, as opposed to a pixel-by-pixel comparison. Accordingly, in some embodiments, the neural network adaptation system utilizes a visual neural network encoder to extract feature vectors from the translated target results and the corresponding source results for comparison. By comparing results within a feature space for training the target generative neural network, the neural network adaptation system improves correspondence between features (e.g., facial identity, pose, hairstyle) of the target and source domains while allowing for variations in style between the source and target domains.

In one or more embodiments, the disclosed neural network adaptation system provides a variety of advantages over conventional systems and methods for adapting generative neural networks to alternative domains. For instance, by utilizing results mapped back to the source domain as input in training a target generative neural network, the neural network adaptation system improves accuracy relative to conventional systems. Specifically, the neural network adaptation system improves correspondence between source and target domains, such that respective source and target generative neural networks produce results with similar features (e.g., facial identity, pose, hairstyle) while generating results that are different in domain style. For example, given a source generative neural network pretrained on a source domain comprising real photo images of various human faces, the disclosed neural network adaptation system adapts a target generative neural network to produce images corresponding to a target domain comprised of caricature faces, cartoon faces, faces of a particular animal, or virtually any other style of image domain while preserving facial features between results of the source and target generative neural networks.

Also, by utilizing an image translation neural network in adapting generative neural networks to target domains, the disclosed neural network adaptation system exhibits increased efficiency relative to conventional systems. For example, while many conventional systems require a generative neural network to be trained on a domain comprising thousands of images, embodiments of the neural network adaptation system are able to adapt a generative neural network to a target domain of significantly fewer images. Indeed, in certain implementations, the neural network adaptation system is capable of effectively adapting a generative neural network to a target domain with as few as one hundred images or less. Further still, while many conventional methods for adapting generative neural networks require early stopping of network training to avoid reduced correspondence by overtraining, implementations of the neural network adaptation system avoid overfitting the target domain by utilizing an image translation network to improve correspondence and preserve features of generated images.

In addition, the disclosed neural network adaptation system provides increased flexibility over conventional system by enabling use of small target domains (i.e., target domains comprising a relatively small number of sample images). Furthermore, the disclosed systems and methods are compatible with any conventional adaptation method to improve correspondence between source and target domains. Indeed, the disclosed neural network adaptation system is readily adaptable to improve various conventional adaptation methods by utilizing an image translation neural network as discussed in greater detail below.

Turning now to the figures, FIG. 1 illustrates a schematic diagram of one embodiment of a system 100 (or environment) in which a neural network adaptation system 106 operates in accordance with one or more embodiments. As illustrated, the system 100 includes server device(s) 102, a network 108, a client device 110, and an image repository 116. As further illustrated, the server device(s) 102, the client device 110, and the image repository 116 communicate with one another via the network 108.

As shown in FIG. 1, the server device(s) 102 include a digital graphics system 104 that further includes the neural network adaptation system 106. For instance, the server device(s) 102 includes, but is not limited to, a computing device (such as explained below in reference to FIG. 9). In some embodiments, the neural network adaptation system 106 utilizes an image translation neural network 122 to translate results of a target generative neural network 120 and compares the translated results with results of a source generative neural network 118. Based on the comparison, the neural network adaptation system 106 adjusts parameters of the target generative neural network 120 in training the target generative neural network to produce results corresponding to a target domain (as further described below).

As mentioned above, the neural network adaptation system 106 generates digital images utilizing the source generative neural network 118, the target generative neural network 120, and the image translation neural network 122. An image (sometimes referred to as "digital image") refers to a digital symbol, picture, icon, and/or other visual illustration depicting one or more objects. For instance, an image includes a digital file having a visual illustration and/or depiction of a person with a hairstyle (e.g., a portrait image) or wrinkles. Indeed, in some embodiments, an image includes, but is not limited to, a digital file with the following extensions: JPEG, TIFF, BMP, PNG, RAW, or PDF. In addition, in certain instances, an image includes a digital frame of a digital video. In particular, in one or more embodiments, an image includes a digital frame within, but not limited to, a digital file with the following extensions: MP4, MOV, WMV, AVI, or AVI.

Furthermore, as shown in FIG. 1, the system 100 includes the client device 110. In some embodiments, the client device 110 includes, but is not limited to, a mobile device (e.g., smartphone, tablet), a laptop, a desktop, or any other type of computing device, including those explained below in reference to FIG. 9. Although not shown in FIG. 1, some embodiments of client device 110 are operated by a user to perform a variety of functions via a digital graphics application 112 and a neural network adaptation application 114. For example, the client device 110 (through the digital graphics application 112 and the neural network adaptation application 114) performs functions such as, but not limited to, adapting generative neural networks to target domains. In addition, in some embodiments, the client device 110 also receives modified versions of generative neural networks (e.g., network parameters of an adapted generative neural network) from the neural network adaptation system 106.

To access the functionalities of the neural network adaptation system 106 (as described above and in greater detail below), in one or more embodiments, a user interacts with the digital graphics application 112 on the client device 110. For example, the digital graphics application 112 includes one or more software applications (e.g., to interact with and/or modify images in accordance with one or more embodiments herein) installed on the client device 110, such the neural network adaptation application 114. In certain instances, the digital graphics application 112 is hosted on the server device(s) 102. Additionally, when hosted on the server device(s) 102, the digital graphics application 112 is accessed by the client device 110 through a web browser and/or another online interfacing platform and/or tool.

Although FIG. 1 illustrates the neural network adaptation system 106 being implemented by a particular component and/or device within the system 100 (e.g., the server device(s) 102), in some embodiments the neural network adaptation system 106 is implemented, in whole or part, by other computing devices and/or components in the system 100. For instance, in some embodiments, the neural network adaptation system 106 is implemented on the client device 110 within the neural network adaptation application 114. More specifically, in one or more embodiments, the description of (and acts performed by) the neural network adaptation system 106 are implemented (or performed by) the neural network adaptation application 114 when the client device 110 implements the neural network adaptation system 106. In particular, in some embodiments, the client device 110 (via an implementation of the neural network adaptation application 114) trains the target generative neural network 120 to generate digital images corresponding to a target domain utilizing the source generative neural network 118 and the image translation neural network 122, as described in further detail below.

In some embodiments, the server device(s) 102 trains one or more machine-learning models described herein. For example, the neural network adaptation system 106 on the server device(s) 102 provides the one or more trained machine-learning models to the neural network adaptation application 114 on the client device 110 for implementation. In other words, the client device 110 obtains (e.g., downloads) the machine-learning models from the server device(s) 102. At this point, the client device 110 may utilize the machine-learning models independent from the server device(s) 102.

In some embodiments, the neural network adaptation application 114 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., a digital image or batch of images). In response, the neural network adaptation system 106 on the server device(s) 102 performs operations described herein to adapt the target generative neural network 120. The server device(s) 102 then provides the output or results of the operations (e.g., network parameters) to the client device 110.

The term "neural network" refers to a machine learning model that can be tuned (e.g., trained) based on inputs to approximate unknown functions. In particular, a neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), a recurrent neural network (e.g., a long short-term memory neural network), a generative adversarial neural network (GAN), or another multi-layer neural network. In some embodiments, a neural network includes a combination of neural networks or neural network components.

Relatedly, the term "generative neural network" refers to a neural network that generates digital content. In some cases, the generative neural network includes a neural network that generates digital images from one or more input features (e.g., an input digital image or noise). For example, a generative neural network includes a neural network that reconstructs target digital images from learned latent vectors. In one or more of the disclosed embodiments, the generative neural network includes a generative adversarial neural network (GAN), such as StyleGAN as described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety. Another example of a GAN includes a StyleGAN2 as described by T. Karras et al. in *Analyzing and improving the image quality of stylegan*, Proceedings of the IEEE/CVF conference on computer vision and pattern recognition, 2020, the content of which is hereby incorporated by reference in its entirety.

As further shown in FIG. 1, the system 100 includes the image repository 116. In one or more embodiments, the image repository 116 includes, but is not limited to, a server device, a cloud service computing device, or any other type of computing device (including those explained below with reference to FIG. 9) that stores one or more digital images. In some embodiments, the neural network adaptation system 106 accesses the image repository 116 to retrieve one or more digital images. For example, the neural network adaptation system 106 utilizes images pertaining to a target domain from the image repository 116 to adapt target generative neural network 120 to the target domain. In some instances, the neural network adaptation system 106 performs the above-mentioned tasks upon receiving a request from the client device 110 to utilize digital images from the image repository 116.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 9. Furthermore, although FIG. 1 illustrates the server device(s) 102, the client devices 110, and the image repository 116 communicating via the network 108, in certain embodiments, the various components of the system 100 communicate and/or interact via other methods (e.g., the server device(s) 102 and the client device 110 communicating directly).

As mentioned above, in one or more embodiments, the neural network adaptation system 106 adapts a pretrained generative neural network to a target domain, such that the adapted generative neural network generates digital images corresponding in style to the target domain. For example, FIG. 2 illustrates the neural network adaptation system 106 generating a source digital image 206 utilizing a source generative neural network 202 pretrained on a source domain and generating a target digital image 208 utilizing a target generative neural network 204 adapted to a target domain.

Figure 2:
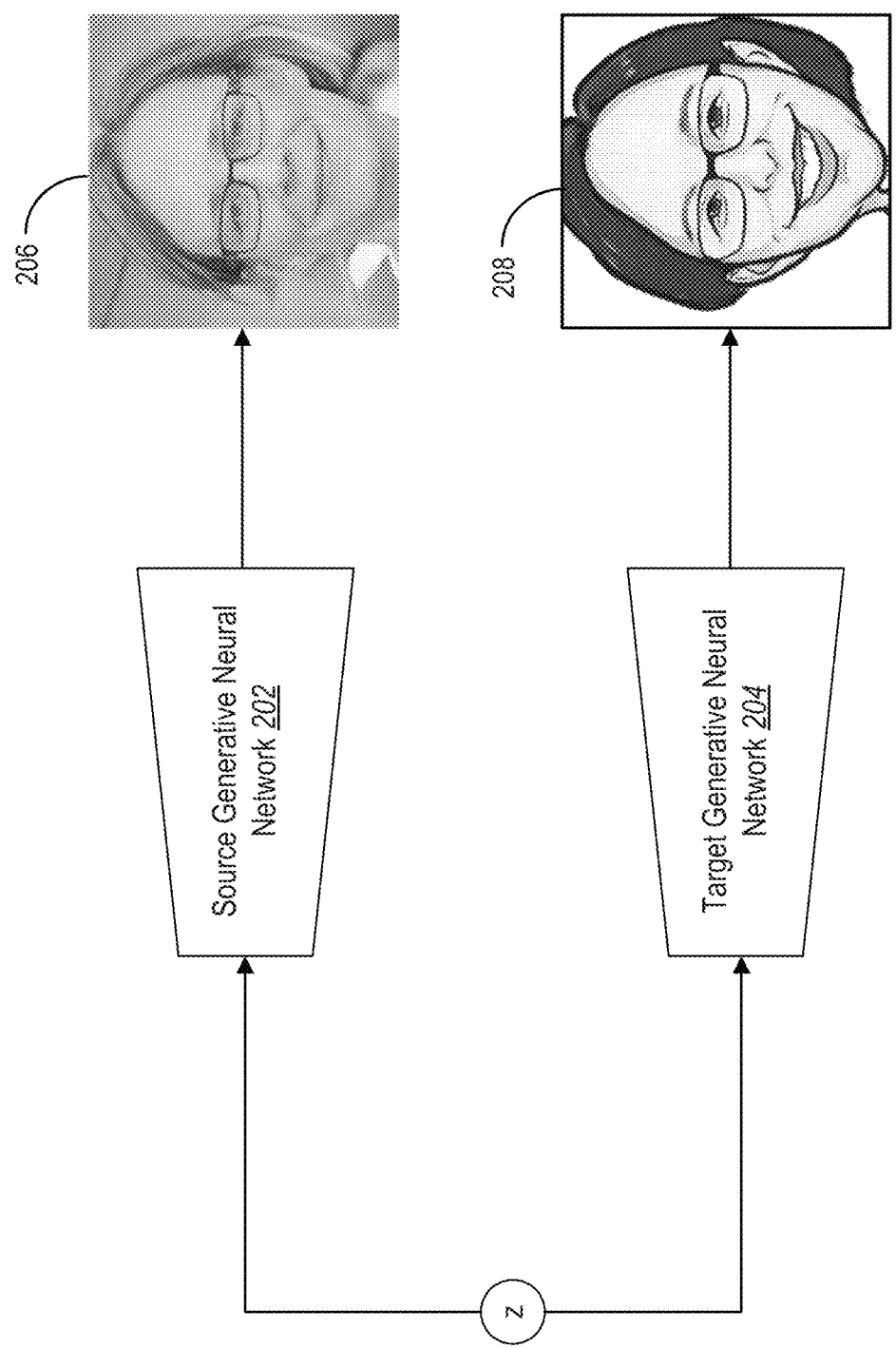
FIG. 2 illustrates an overview of a target generative neural network adapted to a target domain according to one or more embodiments.

As shown in FIG. 2, the neural network adaptation system 106 inputs a latent vector $z$ into the source generative neural network 202 to generate the source digital image 206 comprising, in this exemplary implementation, a photorealistic portrait image of a woman with glasses. As further illustrated, the neural network adaptation system 106 inputs the same latent vector $z$ into the target generative neural network 204 to generate the target digital image comprising a portrait with similar features (i.e., same gender, shape of nose and lips, glasses, etc.), albeit in a caricature style rather than a photorealistic image. Indeed, given the same input latent vector $z$, the source generative neural network 202 and the target generative neural network 204 generate digital images 206, 208 that are similar in features while corresponding in style to respective source and digital domains, as further demonstrated and discussed in relation to FIGS. 6A-6C below.

The terms "latent vector" or "latent code" refer to a digital data embedding of latent (or hidden) features of a neural network. For example, a latent vector includes a vector reflecting features of a digital image that are indecipherable (to a human) but, when processed by layers of a generative neural network, generate a digital image. Relatedly, the term "latent space" refers to a multi-dimensional space containing latent values (e.g., latent vectors) that cannot be interpreted directly but which encode a meaningful internal representation of externally observable features (e.g., features of a digital image). In one or more embodiments, a latent vector comprises a multi-dimensional dataset that represents attributes and/or characteristics of visual features related to an image, video, and/or video frame. In the context of an image, a latent vector includes data representing characteristics (or features) of pixels of the image in some embodiments. Moreover, the term "feature space" refers to a latent space corresponding particularly to features of an image rather than pixels, styles, or other aspects representable by latent vectors.

As mentioned above, in one or more embodiments, the neural network adaptation system 106 utilizes an image translation neural network to adapt a generative neural network to a target domain. For example, FIG. 3 illustrates the neural network adaptation system 106 utilizing an image translation neural network 312 to train a target generative neural network 304 to generate digital images corresponding to a target domain.

Figure 3:
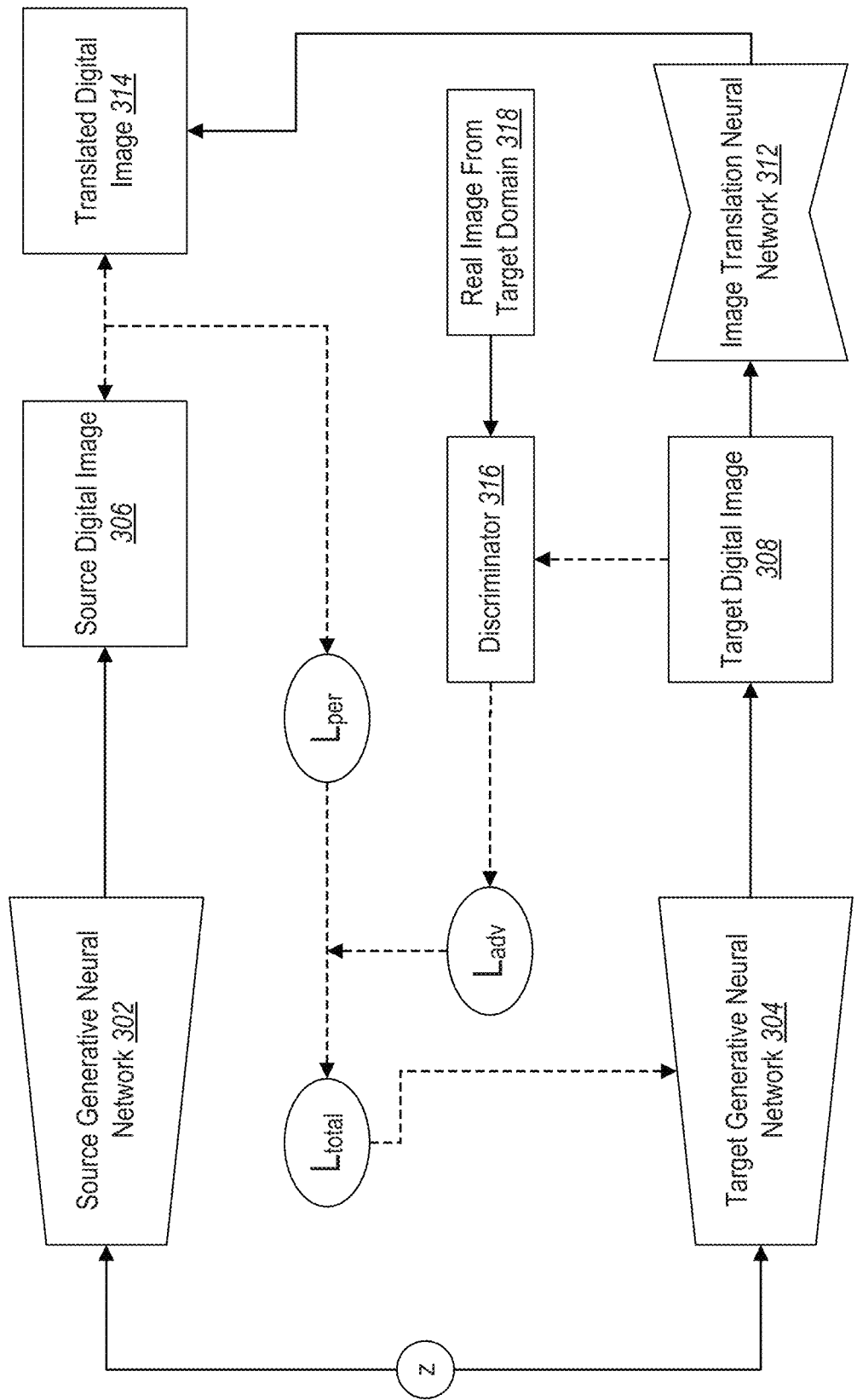
FIG. 3 illustrates an overview of a neural network adaptation system training a target generative neural network according to one or more embodiments.

As shown in FIG. 3, the neural network adaptation system 106 identifies or receives an input latent vector $z$ for an iteration of training the target generative neural network 304. For example, in some implementations, the neural network adaptation system 106 obtains the input latent vector $z$ by sampling a random latent code from a Gaussian distribution. Utilizing the input latent vector $z$, the neural network adaptation system 106 generates a source digital image 306 with a source generative neural network 302 pretrained on a source domain. In addition, the neural network adaptation system 106 generates a target digital image 308 from the input latent vector $z$ with the target generative neural network 304. In one or more embodiments, the neural network adaptation system 106 initializes the target generative neural network 304 with parameters and/or weights of the pretrained source generative neural network 302 prior to training (i.e., adapting) the target generative neural network 304.

As mentioned above, in one or more embodiments, the neural network adaptation system 106 utilizes a pretrained source generative neural network (pretrained on a source domain) as a starting point for training a target generative neural network to generate digital images corresponding to a target domain. For example, in some embodiments, the source generative neural network 302 comprises a style-based generator architecture (e.g., a StyleGAN model) pretrained on a source domain of real images utilizing an adversarial training scheme. As illustrated in FIG. 3, parameters of the source generative neural network 302 are maintained during training of the target generative neural network 304. In particular, the source generative neural network 302 is utilized for initializing the target generative neural network 304 and for generating the source digital image 306 from input latent vector $z$ in each iteration of training the target generative neural network 304, as described in additional detail below.

Furthermore, as shown in FIG. 3, the target generative neural network 304 utilizes the same input latent vector $z$ as used by the source generative neural network 302 to generate the target digital image 308. For each iteration of training, the neural network adaptation system 106 utilizes the generated target digital image 308 in comparison with a real image from the target domain 318 to determine an adversarial loss $L_{adv}$ for training the target generative neural network 304 to generate digital images that are not distinguishable from training examples in the target domain (e.g., the real image from target domain 318). Additionally, as shown in FIG. 3, the neural network adaptation system 106 utilizes an image translation neural network 312 to map the target digital image 308 to the source domain for comparison with the corresponding source digital image 306, thus generating a translated digital image 314. The neural network adaptation system 106 compares the source digital image 306 generated by the source generative neural network 302 with the translated digital image 314 to further train the target generative neural network 304 to minimize the difference between the translated digital image 314 and the source digital image 306 as described in greater detail below.

As illustrated in FIG. 3, the neural network adaptation system 106 utilizes a discriminator 316 as part of an adversarial training process for the target generative neural network 304. For instance, the discriminator 316 and the target generative neural network 304 are in competition with one another, where the target generative neural network 304 attempts to generate predicted digital images, such as the target digital image 308, that fool the discriminator 316 into determining that the predicted digital images are real (e.g., genuine) digital images of the target domain. In some cases, the discriminator 316 is a 70×70 PatchGAN with a fully convolutional architecture of e64:e128:e256:e512.

The neural network adaptation system 106 utilizes an adversarial loss to improve the ability of the discriminator 316 to predict real or fake images. For example, the neural network adaptation system 106 utilizes the adversarial loss to modify or adjust parameters of the target generative neural network 304 (e.g., to reduce the adversarial loss). In various implementations, the neural network adaptation system 106 utilizes the adversarial loss to tune the target generative neural network 304 (e.g., by modifying parameters to reduce the adversarial loss).

In addition, the neural network adaptation system 106 utilizes an adversarial loss as part of the adversarial training to determine a measure of loss (or a measure of accuracy)

indicating how accurately the target generative neural network 304 generates a predicted digital image (e.g., the target digital image 308) that resembles a digital image of the target domain. For example, in the embodiment shown in FIG. 3, the discriminator 316 considers both the target digital image 308 (i.e., an image generated by the target generative neural network 304) and a real image from the target domain 318 and makes a prediction as to which image is real and which is fake. In response to the prediction, the neural network adaptation system 106 utilizes an adversarial loss $L_{adv}$ to adjust parameters of the target generative neural network 304 as mentioned above.

In some cases, the neural network adaptation system 106 utilizes a relativistic adversarial loss represented by two separate adversarial loss functions, one for the target generative neural network 304 and one for the discriminator 316, as given by:

$$L_{adv}^{G} = -\mathbb{E}_{(x_r, x_f) \sim (P, Q)}[\log(\sigma(C(x_f) - C(x_r)))]$$

$$L_{adv}^{G} = -\mathbb{E}_{(x_r, x_f) \sim (P, Q)}[\log(\sigma(C(x_r) - C(x_f)))]$$

where $L_{adv}^{G}$ (denoted $L_{adv}$ in FIG. 3) represents an adversarial loss for the target generative neural network 304 and $L_{adv}^{D}$ (not shown in FIG. 3) represents an adversarial loss for the discriminator 316. In some cases, the neural network adaptation system 106 applies a minimax loss objective function between the generator loss $L_{adv}^{G}$ and the discriminator loss $L_{adv}^{D}$ to train both the target generative neural network 304 and the discriminator 316 together. For instance, in one or more implementations, the neural network adaptation system 106 trains the target generative neural network 304 and the discriminator 316 simultaneously by minimizing the generator loss $L_{adv}^{G}$ and maximizing the discriminator loss $L_{adv}^{D}$. In one or more embodiments, the neural network adaptation system 106 sets the weights of the above adversarial loss functions to 0.01.

In various implementations, the discriminator 316 utilizes a patch-based architecture that includes both a local discriminator and a global discriminator. For example, the neural network adaptation system 106 employs a PatchGAN architecture that determines and penalizes differences based on changes at local image patches. Indeed, in some implementations, the discriminator 316 classifies each patch within a target digital image 308 as real or fake, then averages the classifications across the patches to provide a final input.

Additionally, as illustrated in FIG. 3, the neural network adaptation system 106 utilizes the image translation neural network 312 to generate the translated digital image 314 by mapping the target digital image 308 to the source domain (i.e., the domain of the source generative neural network 302). Details of image translation by the image translation neural network 312 are described in additional detail below in relation to FIG. 4. As mentioned above, the neural network adaptation system 106 compares deep features of translated digital image 314 with deep features of the source digital image 306 to determine a perceptual loss $L_{per}$. In each iteration of training, the neural network adaptation system 106 utilizes perceptual loss $L_{per}$ for training the target generative neural network 304 to minimize differences between the translated digital image 314 and the source digital image 306.

In some embodiments, the neural network adaptation system 106 compares the target digital image 314 and the source digital image 306 in a feature space rather than a pixel space. By comparing features of target and source results to determine the perceptual loss $L_{per}$, the neural network adaptation system 106 minimizes differences between general features (e.g., facial identity, pose, hair style) of the images while allowing for differences in domain styles (e.g., realistic images vs. caricature images). Accordingly, in some embodiments, the neural network adaptation system 106 utilizes an image feature encoder, such as a visual neural network encoder, to extract features from the translated digital image 314 and the source digital image 306 for comparison in determining the perceptual loss $L_{per}$, as describe in additional detail below in relation to FIG. 5.

As further shown in FIG. 3, in some embodiments the neural network adaptation system 106 combines the perceptual loss $L_{per}$ and the adversarial loss $L_{adv}$ to determine a total loss $L_{total}$ for training the target generative neural network 304. In one or more embodiments, for example, the neural network adaptation system 106 determines the total loss $L_{total}$ according to the following function:

$$L_{total} = L_{adv} + \lambda L_{per}(F_{t \rightarrow s}(I_t), I_s)$$

wherein $I_t$ represents the target digital image 308, $I_s$ represents the source digital image, $F_{t \rightarrow s}(I_t)$ represents the translated digital image 314, and $\lambda$ represents a regularization weight configured (i.e., selected) to balance the adversarial loss $L_{adv}$ and the perceptual loss $L_{per}$ in training the target adversarial neural network 304.

Accordingly, the neural network adaptation system 106 adjusts the regularization weight $\lambda$ to control the level of correspondence between the source and target domains when training the target generative neural network 304. For example, a lower value of regularization weight $\lambda$ grants more freedom for the target generative neural network 304 to generate geometric transformations relative to results of the source generative neural network 302. In contrast, a greater value of regularization weight $\lambda$ operates to preserve a greater measure of attributes from the target domain. By utilizing regularization weight $\lambda$ to adjust the level of correspondence, the neural network adaptation system 106 exhibits increased flexibility in adapting generative neural networks to a variety of target domains with an adjustable level of correspondence.

Figure 4:
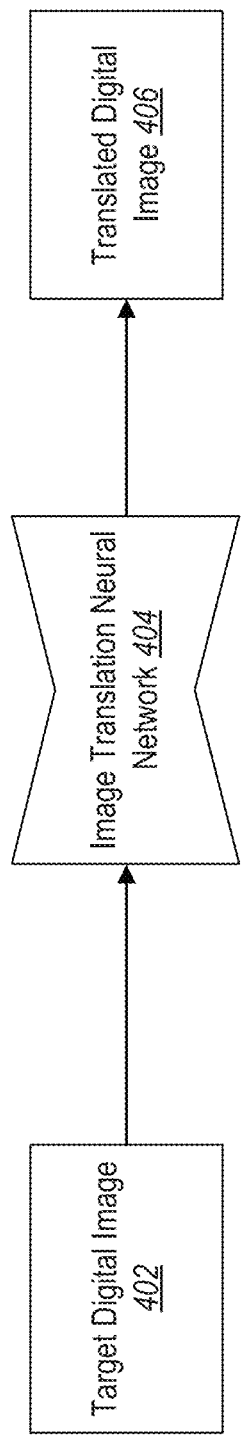
FIG. 4 illustrates a neural network adaptation system utilizing an image translation neural network to map a digital image to a source domain according to one or more embodiments.

As mentioned above, in one or more embodiments, the neural network adaptation system 106 utilizes an image translation neural network to map target results to a source domain for comparison with source results in training a target generative neural network. For example, FIG. 4 illustrates the neural network adaptation system 106 utilizing an image translation neural network to generate a translated digital image 406 from a target digital image 402. In particular, the neural network adaptation system 106 utilizes the image translation neural network 404 to map the target digital image 402 to a source domain for comparison with a digital image generated by a source generative neural network, as described in further detail above in relation to FIG. 3.

In one or more embodiments, the image translation neural network 404 is a deep convolution neural network trained to map a generated target image to a corresponding version in a source domain. For example, in one or more implementations the image translation neural network 404 comprises a network architecture with a deep bottleneck with limited downsampling (or pooling) of the input to prevent loss of spatial information. In one or more implementations, for example, the image translation neural network 404 comprises a pretrained feed-forward convolutional network as described by Johnson et al. in *Perceptual Losses for Real-Time Style Transfer and Super-Resolution*, ECCV 2016, arXiv: 1603.08155, the entire contents of which are hereby incorporated by reference. In another implementation, the image translation neural network 404 comprises a conditional adversarial network as described by Isola et al. in *Image-to-Image Translation with Conditional Adversarial Nets,* 2017 IEEE Conference on Computer Vision and Pattern Recognition (CVPR), pp. 5967-76, doi: 10.1109/CVPR.2017.632, the entire contents of which are hereby incorporated by reference.

Figure 5:
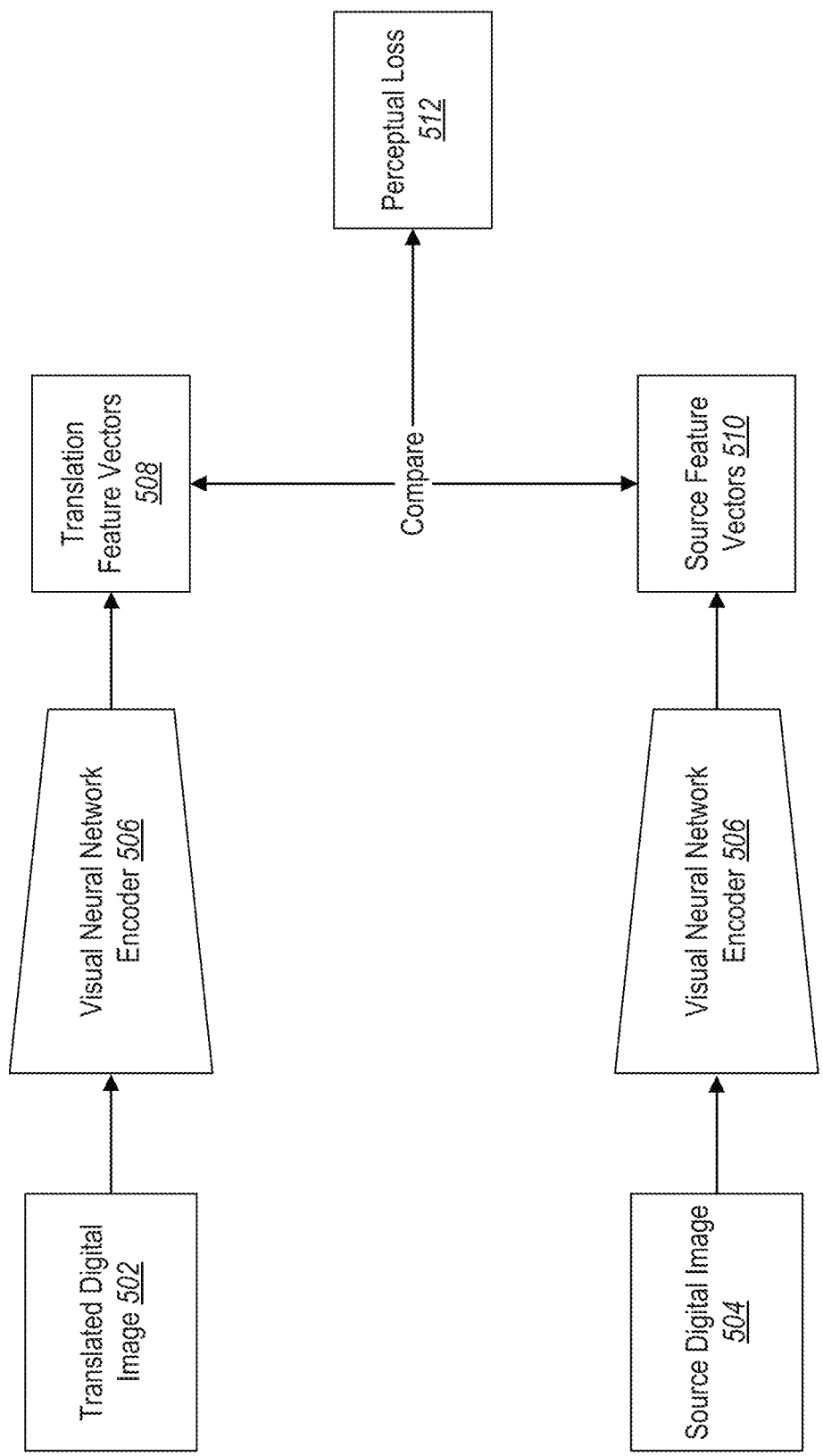
FIG. 5 illustrates a neural network adaptation system utilizing a visual neural network encoder to extract feature vectors from digital images for comparison according to one or more embodiments.

As mentioned above, in one or more embodiments, the neural network adaptation system 106 utilizes an image feature encoder, such as a visual neural network encoder, to extract image features from source results and translated target results for comparison in training a target generative neural network. For example, FIG. 5 illustrates the neural network adaptation system 106 utilizing a visual neural network encoder 506 to extract translation feature vectors 508 from a translated digital image 502 and source feature vectors 510 from a source digital image 504. As shown, the neural network adaptation system 106 compares the translation feature vectors 508 and the source feature vectors 510 to determine a perceptual loss 512 for training a target generative neural network (e.g., as described above in relation to FIG. 3). As mentioned previously, in one or more embodiments, the neural network adaptation system 106 compares the feature vectors 508, 510 and trains the target generative neural network to minimize differences between source and target results in a feature space rather than a pixel space.

In one or more implementations, the visual neural network encoder 506 is a (or part of) pretrained classifier visual neural network configured to extract features from input images, such as but not limited to a Visual Graphics Group (VGG) neural network as described by Simonyan et al. in *Very Deep Convolutional Networks for Large-Scale Image Recognition,* Computer Vision and Pattern Recognition 2014, arXiv:1409.1556, the entire contents of which are hereby incorporated by reference. Moreover, in one or more implementations, the visual neural network encoder 506 utilizes four layers of a VGG neural network for extraction of feature vectors 508, 510.

As illustrated in FIG. 5, the neural network adaptation system 106 utilizes the visual neural network encoder 506 to extract the translation feature vectors 508 and the source feature vectors 510 from the translated digital image 502 and the source digital image 504, respectively. For instance, the neural network adaptation system 106 generates the feature vectors 508, 510 by processing the digital images 502, 504 utilizing the visual neural network encoder 506 and then extracting the features of a particular size from a convolutional layer of the visual neural network encoder 506. To illustrate, in the case of a pre-trained neural network (e.g., a pretrained VGG neural network), the neural network adaptation system 106 extracts the feature vectors 508, 510 from a convolutional neural network layer of the visual neural network encoder 506 (and prior to a classification or final activation layer of the visual neural network or VGG neural network). Alternatively, the neural network adaptation system 106 trains a new visual neural network to generate the feature vectors 508, 510 as an output at a final layer of the visual neural network or VGG neural network.

The term "feature vector" refers to a latent feature of a digital material. In particular, a feature vector refers to a latent feature of a digital material extracted from a deep neural network, such as a deep convolutional neural network. For example, a feature vector, in one or more implementations, includes a latent feature extracted from a texture map. In one or more embodiments, a feature vector corresponds to a visual appearance of a digital image (e.g., a visual appearance of a digital material presented in a digital image). In one or more implementations, a feature vector corresponds to features unrelated to visual appearance as well.

Figure 6A:
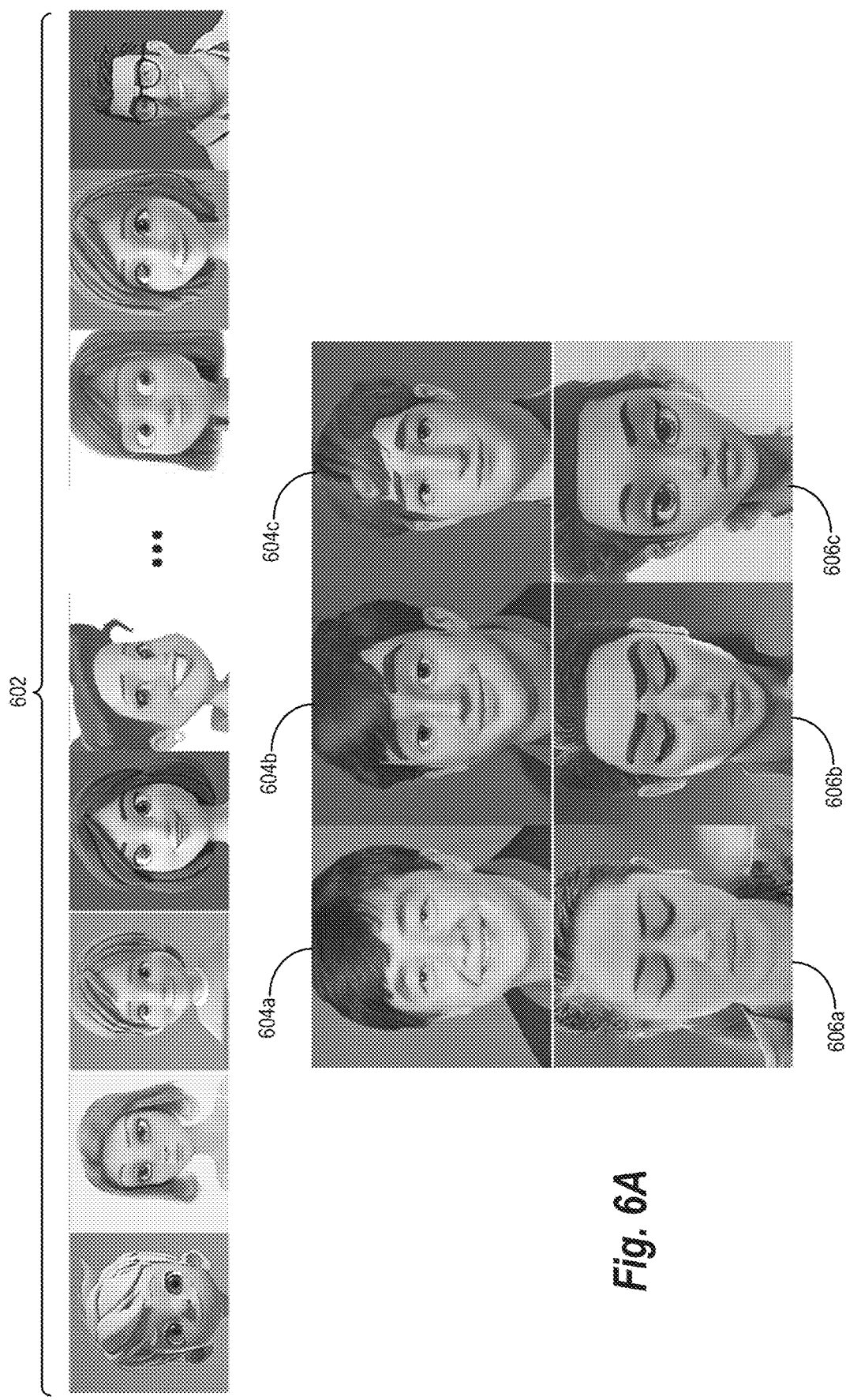
FIGS. 6A-6C illustrate experimental results of an adapted target generative neural network generating digital images according to one or more embodiments.
Figure 6B:
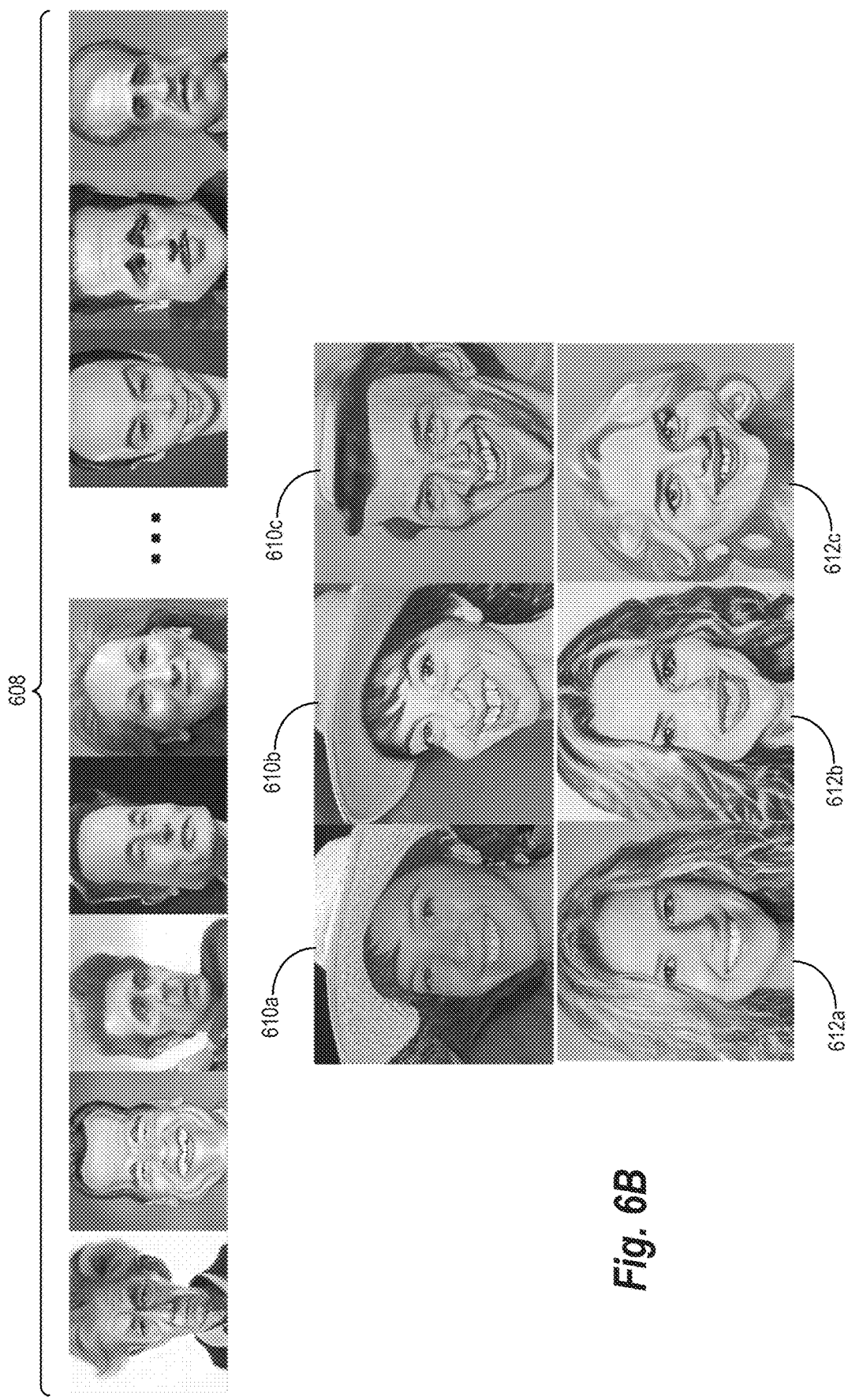
Figure 6C:
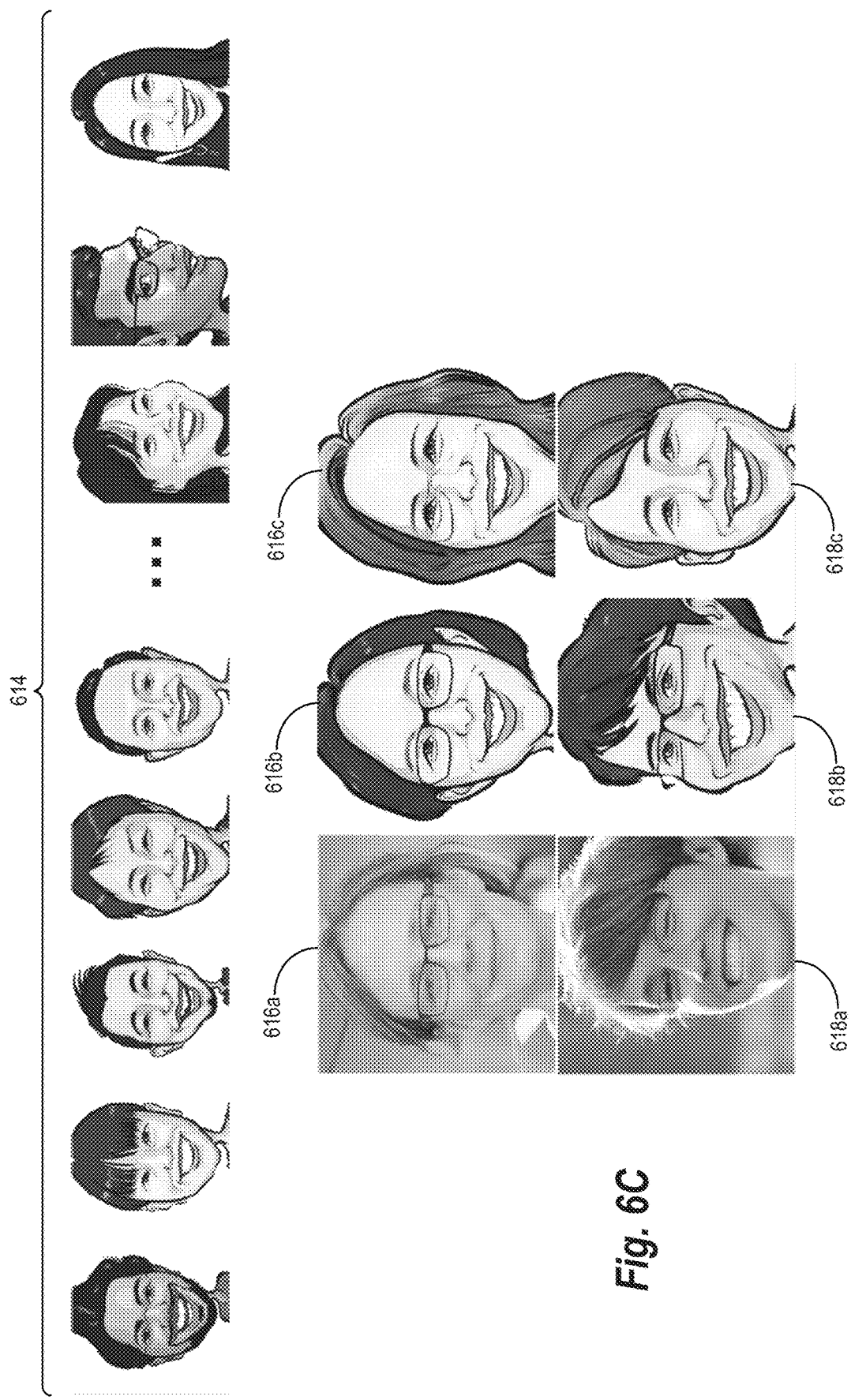

To further illustrate, FIGS. 6A-6C show experimental results of implementations of the neural network adaptation system 106 utilizing various elements of the disclosed embodiments to generate target digital images corresponding to target domains. For instance, FIG. 6A shows results of a target generative network adapted by a neural network adaptation system 106 to a target domain 602 comprising Disney animation-style cartoon faces (600 images in total). Specifically, images 604a and 606a are results from a source generative neural network trained on a source domain comprising real facial images. Images 604b and 606b are results from a target generative neural network adapted to the target domain 602 utilizing a neural network adaptation system 106 according to one or more embodiments disclosed herein. Images 604c and 606c are results from a generative neural network adapted to the source domain 602 using conventional methods.

Indeed, as shown in FIG. 6A, images 604b and 606b (generated using the disclosed methods for generative neural network adaptation) exhibit improved correspondence to images 604a and 606a (generated using a source generative neural network) compared to images 604c and 606c. In particular, images 604b and 606b differ from images 604a and 606b in style but are similar in features, such as the hair and facial identity of images 604a and 604b and the hairstyle and closed eyes of images 606a and 606b. In contrast, the aforementioned features are not exhibited with the same level of similarity when comparing images 604a and 606a with images 604c and 606c, respectively.

Similarly, FIG. 6B shows results of a target generative network adapted by a neural network adaptation system 106 to a target domain 608 comprising exaggerated caricature faces (700 images in total). Specifically, images 610a and 612a are results from a source generative neural network trained on a source domain comprising real facial images. Images 610b and 612b are results from a target generative neural network adapted to the target domain 608 utilizing a neural network adaptation system 106 according to one or more embodiments disclosed herein. Images 610c and 612c are results from a generative neural network adapted to the source domain 608 using conventional methods.

Indeed, as shown in FIG. 6B, images 610b and 612b (generated using the disclosed methods for generative neural network adaptation) exhibit improved correspondence to images 610a and 612a (generated using a source generative neural network) compared to images 610c and 612c. In particular, images 610b and 612b differ from images 610a and 612b in style but are similar in features, such as the hat, hairstyle, and gender of images 610a and 610b and the hairstyle and facial identity of images 612a and 612b. In contrast, the aforementioned features are not exhibited with the same level of similarity when comparing images 610a and 612a with images 610c and 612c, respectively.

Also, FIG. 6C shows results of a target generative network adapted by a neural network adaptation system 106 to a target domain 614 comprising caricature faces by a particular artist (300 images in total). Specifically, images 616a and 618a are results from a source generative neural network trained on a source domain comprising real facial images. Images 616b and 618b are results from a target generative neural network adapted to the target domain 614 utilizing a neural network adaptation system 106 according to one or more embodiments disclosed herein. Images 616c and 618c are results from a generative neural network adapted to the source domain 614 using conventional methods.

Indeed, as shown in FIG. 6C, images 616b and 618b (generated using the disclosed methods for generative neural network adaptation) exhibit improved correspondence to images 616a and 618a (generated using a source generative neural network) compared to images 616c and 618c. In particular, images 616b and 618b differ from images 616a and 618b in style but are similar in features, such as the hairstyle and glasses of images 616a and 616b and the pose angle and glasses of images 618a and 618b. In contrast, the aforementioned features are not exhibited with the same level of similarity when comparing images 616a and 618a with images 616c and 618c, respectively.

Figure 7:
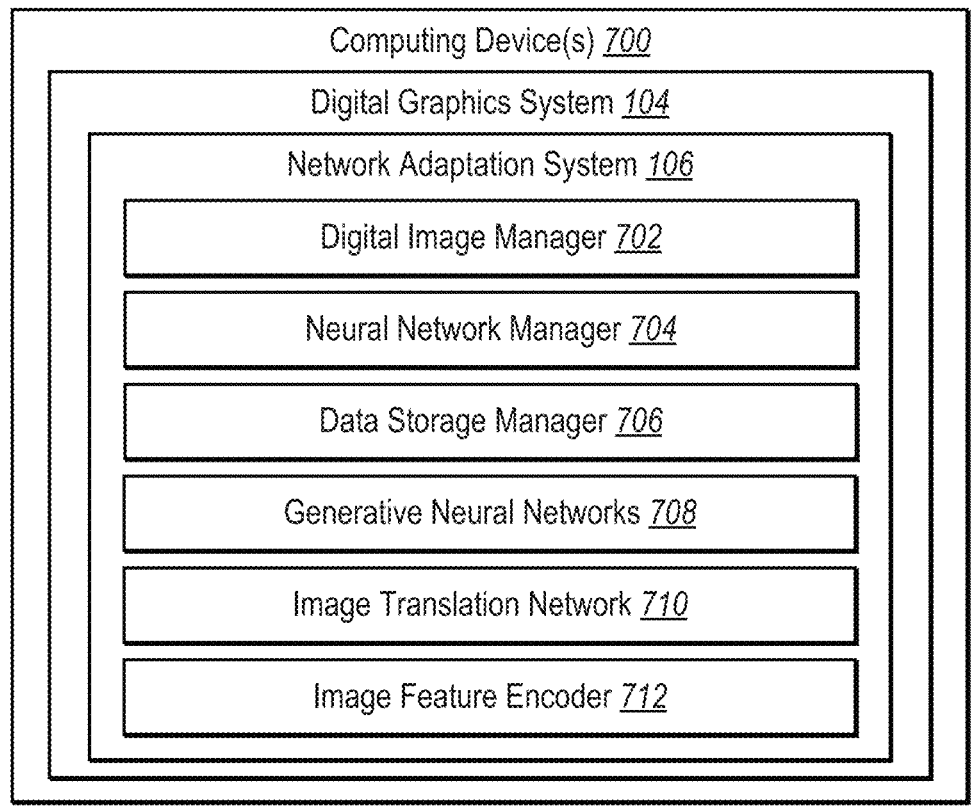
FIG. 7 illustrates a schematic diagram of a neural network adaptation system in accordance with one or more embodiments.

Turning now to FIG. 7, additional detail will be provided regarding components and capabilities of one or more embodiments of the neural network adaptation system 106. In particular, FIG. 7 illustrates an example neural network adaptation system 106 executed by a computing device(s) 700 (e.g., the server devices(s) 102 or the client device 110). As shown by the embodiment of FIG. 7, the computing device(s) 700 includes or hosts the digital graphics system 104 and the neural network adaptation system 106. Furthermore, as shown in FIG. 7, the neural network adaptation system 106 includes a digital image manager 702, a neural network manager 704, a data storage manager 706, generative neural networks 708, an image translation network 710, and an image feature encoder 712 (e.g., a visual neural network encoder as described above in relation to FIG. 5).

As just mentioned, and as illustrated in the embodiment of FIG. 7, the neural network adaptation system 106 includes the digital image manager 702. For instance, the digital image manager 702 identifies, stores, transmits, and/or displays digital images (and/or digital videos) as described above (e.g., in relation to FIGS. 2-5 and 6A-6C). In some instances, the digital image manager 702 stores digital images with corresponding latent code/vectors pre-embedded in latent space using an encoder as described above (e.g., in relation to FIGS. 2-5).

Furthermore, as shown in FIG. 7, the neural network adaptation system 106 includes the neural network manager 704. For instance, the neural network manager 704 manages the various neural networks described herein, such as the generative neural networks 708 (e.g., source and target generative neural networks as described above in relation to FIGS. 1-3), the image translation network 710 (e.g., as described above in relation to FIGS. 1 and 3-4), and the image feature encoder 712 (e.g., a visual neural network encoder as described above in relation to FIG. 5).

As also shown in FIG. 7, the neural network adaptation system 106 includes the data storage manager 706. In some embodiments, the data storage manager 706 is implemented by one or more memory devices. Additionally, in certain instances, the data storage manager 706 maintains data to perform one or more functions of the neural network adaptation system 106. For example, the data storage manager 706 includes digital images, latent code and/or neural network components (e.g., neural network parameters, neural network channel weights, GAN data, GAN parameters) of the generative neural networks 708, the image translation network 710, and the image feature encoder 712.

Each of the components 702-712 of the neural network adaptation system 106 can include software, hardware, or both. For example, the components 702-712 can include one or more instructions stored on a computer-readable storage medium and executable by processors of one or more computing devices, such as a client device or server device. When executed by the one or more processors, the computer-executable instructions of the neural network adaptation system 106 can cause the computing device(s) 700 to perform the methods described herein. Alternatively, the components 702-712 can include hardware, such as a special-purpose processing device to perform a certain function or group of functions. Alternatively, the components 702-712 of the neural network adaptation system 106 can include a combination of computer-executable instructions and hardware.

Furthermore, the components 702-712 of the neural network adaptation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-712 may be implemented as a stand-alone application, such as a desktop or mobile application. Furthermore, the components 702-712 may be implemented as one or more web-based applications hosted on a remote server. The components 702-712 may also be implemented in a suite of mobile device applications or "apps." To illustrate, the components 702-712 may be implemented in an application, including but not limited to, ADOBE PHOTOSHOP, ADOBE PREMIERE, ADOBE LIGHTROOM, ADOBE ILLUSTRATOR, ADOBE CREATIVE CLOUD, ADOBE SENSEI, or ADOBE STOCK. "ADOBE," "ADOBE PHOTOSHOP," "ADOBE PREMIERE," "ADOBE LIGHTROOM," "ADOBE ILLUSTRATOR," "ADOBE CREATIVE CLOUD," "ADOBE SENSEI," and "ADOBE STOCK" are either registered trademarks or trademarks of Adobe Systems Incorporated in the United States and/or other countries.

Figure 8:
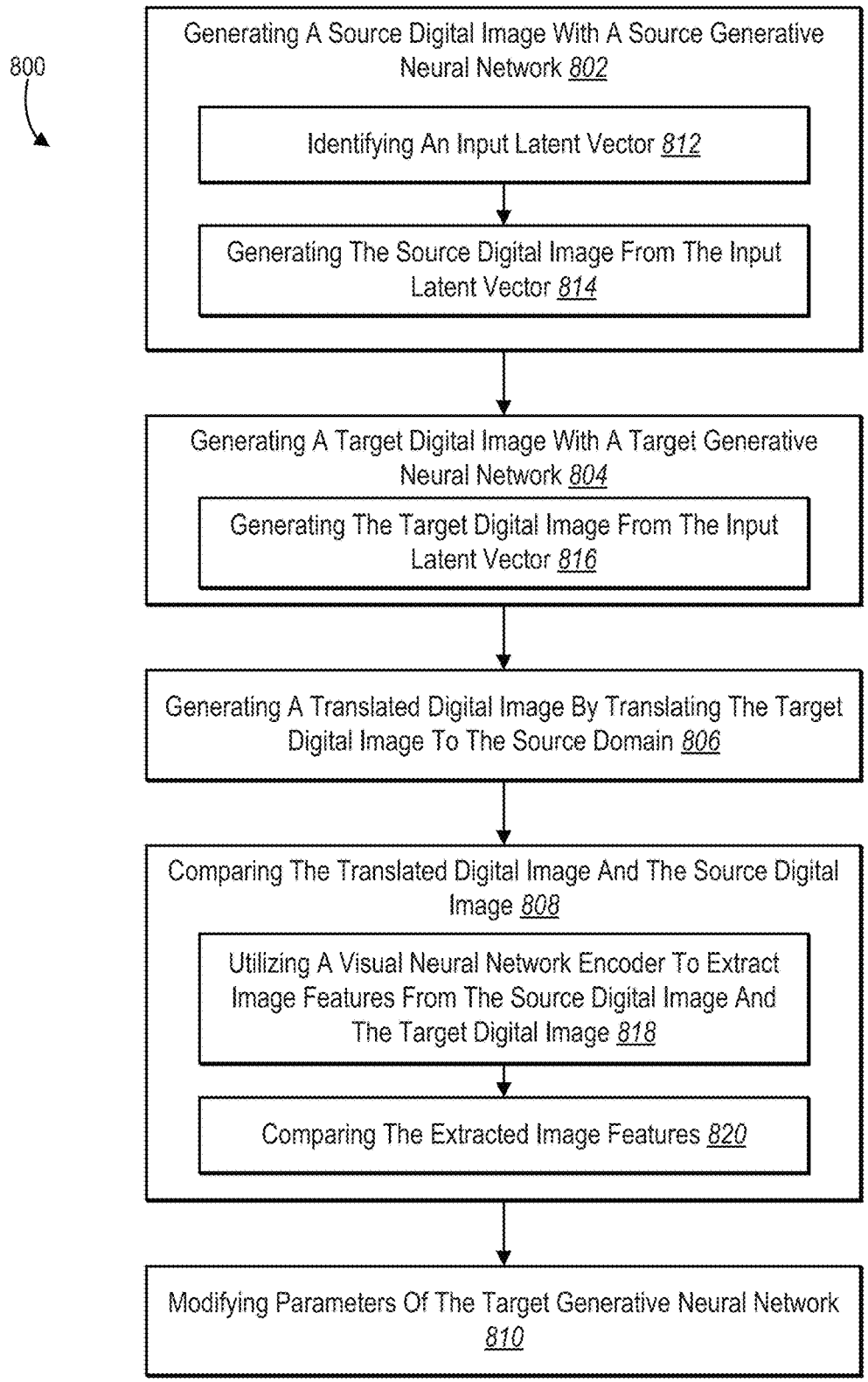
FIG. 8 illustrates a flowchart of a series of acts for adapting a target generative neural network to a target domain in accordance with one or more embodiments.

FIGS. 1-7, the corresponding text, and the examples provide a number of different methods, systems, devices, and non-transitory computer-readable media of the neural network adaptation system 106. In addition to the foregoing, one or more embodiments can also be described in terms of flowcharts comprising acts for accomplishing a particular result, as shown in FIG. 8. The acts shown in FIG. 8 may be performed in connection with more or fewer acts. Further, the acts may be performed in differing orders. Additionally, the acts described herein may be repeated or performed in parallel with one another or parallel with different instances of the same or similar acts.

As mentioned above, FIG. 8 illustrates a flowchart of a series of acts 800 for adapting a target generative neural network to a target domain in accordance with one or more embodiments. While FIG. 8 illustrates acts according to one embodiment, alternative embodiments may omit, add to, reorder, and/or modify any acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8. Moreover, the acts of FIG. 8 can be performed as part of a computer-implemented method.

As shown in FIG. 8, the series of acts 800 includes an act 802 of generating a source digital image with a source generative neural network. As also shown in FIG. 8, the act 802 can further include an act 812 of identifying an input latent vector and an act 814 of generating the source digital image from the input latent vector. For example, in some embodiments, the act 802 includes identifying an input latent vector and generating, from the input latent vector, a source digital image utilizing a source generative neural network corresponding to a source domain. In some embodiments, the act 802 also includes mapping an input digital image from the target domain to a latent space to generate the input latent vector. Further, in some embodiments, the act 802 includes utilizing a source generative neural network comprising a pretrained generative adversarial neural network.

Moreover, in some embodiments, the act 802 includes training the source generative neural network utilizing a plurality of source digital images from the source domain. In some embodiments, the act 802 includes utilizing a source generative neural network comprising a generative adversarial neural network. Further, in some embodiments, the act 802 includes identifying the input latent vector by mapping an input digital image from the target domain to a latent space to generate the input latent vector.

As also shown in FIG. 8, the series of acts 800 includes an act 804 of generating a target digital image with a target generative neural network. As also shown in FIG. 8, the act 804 can further include an act 816 of generating the target digital image from the input latent vector identified in act 812. For example, in some embodiments, the act 804 includes generating, from the input latent vector, a target digital image utilizing a target generative neural network corresponding to a target domain. Further, in some embodiments, the act 804 includes initializing the one or more parameters of the target generative neural network by matching them with one or more corresponding parameters of the source generative neural network.

Moreover, in some embodiments, the act 804 includes initializing the one or more parameters of the target generative neural network by matching them with one or more corresponding parameters of the source generative neural network. In some embodiments, the act 804 includes utilizing a target generative neural network comprising a generative adversarial neural network.

Additionally, as shown in FIG. 8, the series of acts 800 includes an act 806 of generating a translated digital image by translating the target digital image to a source domain. For example, in some embodiments, the act 806 includes translating the target digital image to the source domain utilizing an image translation neural network to generate a translated digital image.

Also, as shown in FIG. 8 the series of acts 800 includes an act 808 of comparing the translated digital image and the source digital image. As also shown in FIG. 8, the act 808 can further include an act 818 of utilizing a visual neural network encoder to extract image features from the source digital image and the target digital image and an act 820 of comparing the extracted image features. For example, in some embodiments, the act 808 includes utilizing a visual neural network encoder to extract image features from the source digital image and the translated digital image. Further, in some embodiments, the act 808 includes extracting image features by extracting a plurality of vectors from a plurality of convolutional layers of a visual neural network encoder.

Moreover, in some embodiments, the act 808 includes performing the comparison of the source digital image and the translated digital image within a feature space. Relatedly, in some embodiments, the act 808 includes utilizing a visual neural network encoder to extract image features from the source digital image and the translated digital image and performing the comparison of the source digital image and the translated digital image by comparing the extracted image features of the source digital image and the translated digital image. Also, in some embodiments, the act 808 includes comparing the extracted image features of the source digital image and the translated digital image to determine a perceptual loss.

In addition, as shown in FIG. 8, the series of acts 800 includes an act 810 of modifying parameters of the target generative neural network. For example, in some embodiments, the act 810 includes modifying one or more parameters of the target generative neural network based on a comparison of the source digital image and the translated digital image. In some embodiments, the act 810 further includes utilizing an adversarial loss to modify the one or more parameters of the target generative neural network. Further, in some embodiments, the act 810 includes modifying the one or more parameters of the target generative neural network based on a comparison of the extracted image features of the source digital image and the translated digital image. Also, in some embodiments, the act 810 includes modifying the one or more parameters of the target generative neural network utilizing a perceptual loss to reduce a difference between the extracted image features of the source digital image and the translated digital image.

Moreover, in some embodiments, that act 810 includes modifying the one or more parameters of the target generative neural network utilizing a perceptual loss to reduce a difference between the extracted image features of the source digital image and the translated digital image. Also, in some embodiments, the act 810 includes modifying the one or more parameters of the target generative neural network utilizing an adversarial loss.

Further, in some embodiments, the act 810 includes modifying one or more parameters of the target generative neural network utilizing a perceptual loss to reduce a difference between the source digital image and the translated digital image. In some embodiments, the act 810 includes modifying the one or more parameters of the target generative neural network utilizing a combination of the perceptual loss and an adversarial loss. Also, in some embodiments, the act 810 includes adjusting a weight of the perceptual loss to allow the target generative neural network to generate digital images with less spatial correspondence to digital images generated by the source generative neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
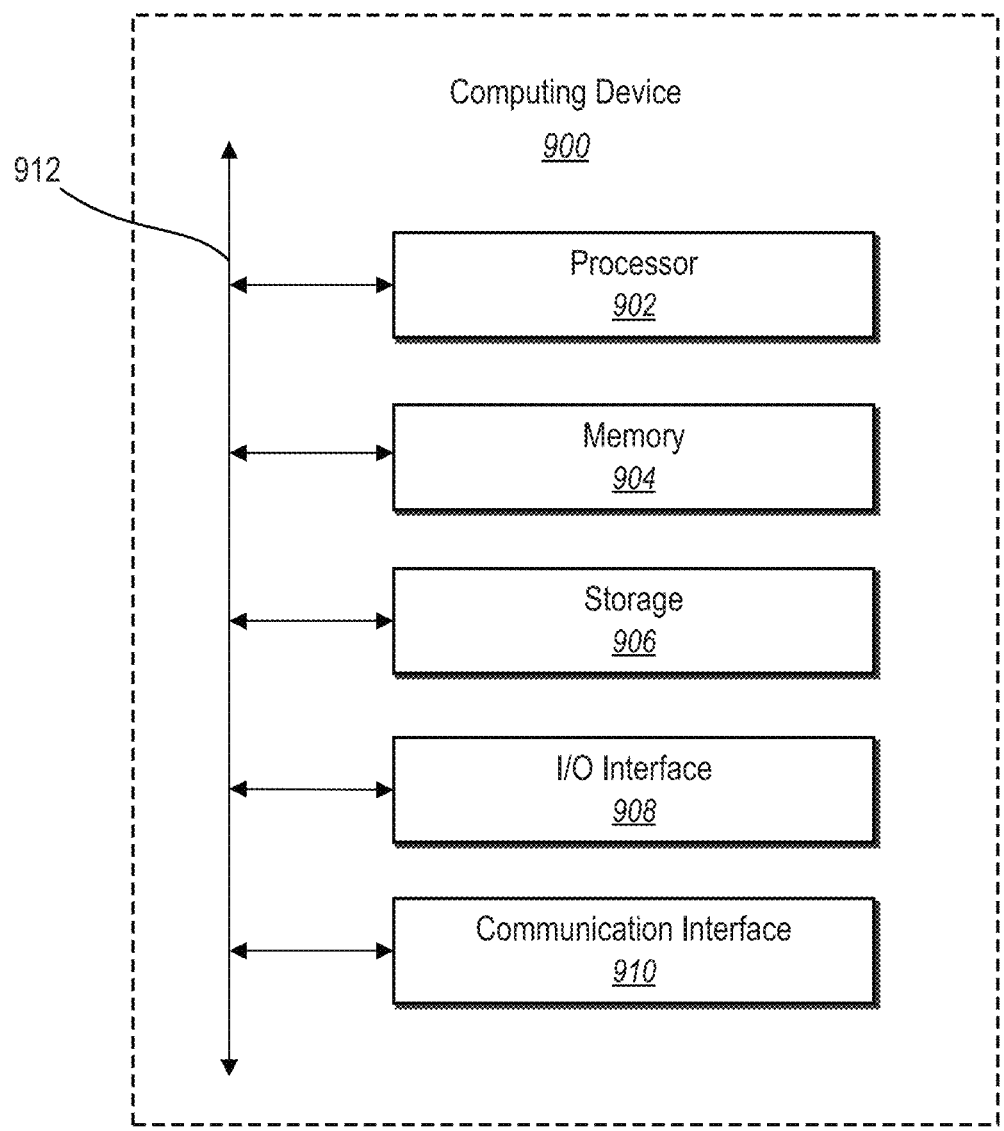
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., computing device(s) 700, server device(s) 102, and client device 110). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions, which when executed by at least one processor, cause the at least one processor to perform operations comprising:
   identifying an input latent vector;
   generating, from the input latent vector, a source digital image utilizing a source generative neural network corresponding to a source domain;
   generating, from the input latent vector, a target digital image utilizing a target generative neural network corresponding to a target domain;
   translating the target digital image to the source domain utilizing an image translation neural network to generate a translated digital image; and
   modifying one or more parameters of the target generative neural network based on a comparison of the source digital image and the translated digital image.

2. The non-transitory computer-readable medium of claim 1, wherein identifying the input latent vector comprises mapping an input digital image from the target domain to a latent space to generate the input latent vector.

3. The non-transitory computer-readable medium of claim 1, wherein modifying the one or more parameters of the target generative neural network further comprises utilizing an adversarial loss.

4. The non-transitory computer-readable medium of claim 1, wherein the source generative neural network comprises a pretrained generative adversarial neural network.

5. The non-transitory computer-readable medium of claim 4, wherein the operations further comprise initializing the one or more parameters of the target generative neural network by matching them with one or more corresponding parameters of the source generative neural network.

6. The non-transitory computer-readable medium of claim 1, wherein the operations further comprise:
   utilizing a visual neural network encoder to extract image features from the source digital image and the translated digital image; and
   modifying the one or more parameters of the target generative neural network based on a comparison of the extracted image features of the source digital image and the translated digital image.

7. The non-transitory computer-readable medium of claim 6, wherein the visual neural network encoder comprises a plurality of convolutional layers, and wherein extracting image features comprises extracting a plurality of vectors from the plurality of convolutional layers of the visual neural network encoder.

8. The non-transitory computer-readable medium of claim 7, wherein modifying the one or more parameters of the target generative neural network further comprises utilizing a perceptual loss to reduce a difference between the extracted image features of the source digital image and the translated digital image.

9. A computer-implemented method comprising:
identifying an input latent vector;
generating, from the input latent vector, a source digital image utilizing a source generative neural network corresponding to a source domain;
generating, from the input latent vector, a target digital image utilizing a target generative neural network corresponding to a target domain;
translating the target digital image to the source domain utilizing an image translation neural network to generate a translated digital image; and
modifying one or more parameters of the target generative neural network based on a comparison of the source digital image and the translated digital image.

10. The computer-implemented method of claim 9, further comprising:
training the source generative neural network utilizing a plurality of source digital images from the source domain; and
initializing the one or more parameters of the target generative neural network by matching them with one or more corresponding parameters of the source generative neural network.

11. The computer-implemented method of claim 9, further comprising performing the comparison of the source digital image and the translated digital image within a feature space.

12. The computer-implemented method of claim 9, further comprising:
utilizing a visual neural network encoder to extract image features from the source digital image and the translated digital image; and
performing the comparison of the source digital image and the translated digital image by comparing the extracted image features of the source digital image and the translated digital image.

13. The computer-implemented method of claim 12, further comprising modifying the one or more parameters of the target generative neural network utilizing a perceptual loss to reduce a difference between the extracted image features of the source digital image and the translated digital image.

14. The computer-implemented method of claim 13, wherein modifying the one or more parameters of the target generative neural network further comprises utilizing an adversarial loss.

15. The computer-implemented method of claim 9, wherein the source generative neural network and the target generative neural network each comprise generative adversarial neural networks.

16. A system comprising:
one or more memory devices comprising a source generative neural network, a target generative neural network, and an image translation neural network; and
one or more processors configured to cause the system to:
identify an input latent vector;
generate, from the input latent vector, a source digital image utilizing a source generative neural network corresponding to a source domain;
generate, from the input latent vector, a target digital image utilizing a target generative neural network corresponding to a target domain;
translate the target digital image to the source domain utilizing an image translation neural network to generate a translated digital image; and
modify one or more parameters of the target generative neural network utilizing a perceptual loss to reduce a difference between the source digital image and the translated digital image.

17. The system of claim 16, wherein identifying the input latent vector comprises mapping an input digital image from the target domain to a latent space to generate the input latent vector.

18. The system of claim 17, wherein the one or more processors are further configured to cause the system to modify the one or more parameters of the target generative neural network utilizing a combination of the perceptual loss and an adversarial loss.

19. The system of claim 18, wherein the one or more processors are further configured to cause the system to adjust a weight of the perceptual loss to allow the target generative neural network to generate digital images with less spatial correspondence to digital images generated by the source generative neural network.

20. The system of claim 16, wherein the one or more memory devices further comprise a visual neural network encoder, and wherein the one or more processors are further configured to cause the system to:
extract image features from the source digital image and the translated digital image utilizing the visual neural network encoder; and
compare the extracted image features of the source digital image and the translated digital image to determine the perceptual loss.

* * * * *